(12) United States Patent
Fan et al.

(10) Patent No.: US 10,366,106 B2
(45) Date of Patent: Jul. 30, 2019

(54) QUORUM-BASED REPLICATION OF DATA RECORDS

(71) Applicant: SAP SE, Walldorf (DE)

(72) Inventors: Hua Fan, Kitchener (CA); Jeffrey Pound, Kitchener (CA); Peter Bumbulis, Kitchener (CA); Anil Kumar Goel, Waterloo (CA); Scott MacLean, Ottawa (CA); Nathan Auch, Waterloo (CA); Eric Garber, Waterloo (CA)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 15/373,844

(22) Filed: Dec. 9, 2016

(65) Prior Publication Data

US 2018/0165343 A1    Jun. 14, 2018

(51) Int. Cl.

| G06F 17/30 | (2006.01) |
|---|---|
| G06F 16/27 | (2019.01) |
| H04W 4/06 | (2009.01) |
| H04L 29/08 | (2006.01) |
| G06F 16/23 | (2019.01) |
| G06F 3/06 | (2006.01) |

(52) U.S. Cl.
CPC .......... *G06F 16/275* (2019.01); *G06F 16/273* (2019.01); *H04L 67/1002* (2013.01); *H04W 4/06* (2013.01); *G06F 3/067* (2013.01); *G06F 16/2358* (2019.01); *G06F 16/2365* (2019.01)

(58) Field of Classification Search
CPC ......... G06F 17/30575; G06F 17/30578; G06F 11/1425; G06F 11/1451; G06F 17/30371; G06F 17/30581; G06F 16/27; G06F 16/273; G06F 3/067; G06F 16/2365; G06F 16/275; G06F 16/2358; G06F 16/122; G06F 16/181
USPC ........ 707/620, 634, 613, 623, 638, 648, 683
See application file for complete search history.

(56) References Cited

U.S. PATENT DOCUMENTS

| 9,021,296 B1 * | 4/2015 | Kiselev ................... G06F 16/21 |
|---|---|---|
| | | 714/6.23 |
| 9,576,038 B1 * | 2/2017 | Huang .............. G06F 17/30575 |
| 9,785,510 B1 * | 10/2017 | Madhavarapu ..... G06F 11/1451 |
| 10,169,441 B2 * | 1/2019 | Chen ..................... G06F 16/275 |

(Continued)

OTHER PUBLICATIONS

Gustavo Alonso et al., *Proceedings of the 18th International Conference on Extending Database Technology*, EDBT 2015, Mar. 23-27, 2015, 9 pages, Brussels, Belgium.

(Continued)

*Primary Examiner* — Dangelino N Gortayo
(74) *Attorney, Agent, or Firm* — Sterne, Kessler, Goldstein & Fox P.L.L.C.

(57) ABSTRACT

Disclosed herein are system, method, and computer program product embodiments for quorum-based replication of data records. In one embodiment, a read request for reading a record is received from a user node on a replica node of a cluster of replica nodes. The record is then determined not committed on the replica node. In response to the determination, an update message indicative of whether the number of replica nodes on which the record is durable exceeds a threshold is received on the replica node. In response to the number of replica nodes exceeds the threshold, a value of the record on the replica node is transmitted to the user node.

20 Claims, 9 Drawing Sheets

(56) References Cited

U.S. PATENT DOCUMENTS

| | | | |
|---|---|---|---|
| 2010/0250750 A1* | 9/2010 | Massa | G06F 11/1479 709/226 |
| 2013/0290249 A1* | 10/2013 | Merriman | G06F 17/30578 707/610 |
| 2014/0279929 A1* | 9/2014 | Gupta | G06F 11/1471 707/683 |
| 2017/0228285 A1* | 8/2017 | Merritt | G06F 11/1076 |

OTHER PUBLICATIONS

Mahesh Balakrishnan et al., *CORFU: A Distributed Shared Log*, ACM Transactions on Computer Systems, Dec. 2013, 14 pages, vol. 31, Issue 4.

Mahesh Balakrishnan et al., *Tango: Distributed Data Structures Over a Shared Log*, Proceedings of the Twenty-Fourth ACM Symposium on Operating Systems Principles, SOSP '13, 2013, pp. 325-340, ACM, New York, NY, USA.

Philip A Bernstein et al., *Concurrency Control and Recovery in Database Systems*, 1986, pp. 9-20, Addison-Wesley Longman Publishing Co., Inc., Boston, MA, USA.

Anil K. Goel et al., *Towards Scalable Real-time Analytics: An Architecture for Scale-out of OLxP Workloads*, Proceedings of the VLDB Endowment, Aug. 2015, pp. 1716-1727, vol. 8, Issue 12.

Joanne Holliday et al., *The Performance of Database Replication with Group Multicast*, Proceedings of the Twenty-Ninth Annual International Symposium on Fault-Tolerant Computing, FTCS '99, 1999, pp. 158-165, IEEE Computer Society, Washington, DC, USA.

Ricardo Jimenez-Peris et al., *Are Quorums an Alternative for Data Replication?*, ACM Transactional Database Systems, Sep. 2003, 257-294, vol. 28, Issue 3.

Bettina Kemme and Gustavo Alonso, *A Suite of Database Replication Protocols Based on Group Communication Primitives*, The Proceedings of ICDCS'98, May 1998, pp. 156-163, IEEE.

Jay Kreps et al., *Kafka: A Distributed Messaging System for Log Processing*, Proceedings of the NetDB, Jun. 12, 2011, pp. 1-7.

Leslie Lamport, *Paxos Made Simple*, Proceedings of the 6$^{th}$ International Conference on Principles of Distributed Systems, OPODIS 2002, Nov. 1, 2001, 14 pages, Reims, France.

Leslie Lamport, *The Part-Time Parliament*, ACM Transactions on Computer Systems, May 1998, pp. 133-169, vol. 16, Issue 2.

John Meehan et al., *S-store: Streaming Meets Transaction Processing*, Proceedings of the VLDB Endowment, Sep. 2015, pp. 2134-2145, vol. 8, Issue 13.

Shadi A. Noghabi et al., *Ambry: LinkedIn's Scalable Geo-Distributed Object Store*, Proceedings of the 2016 International Conference on Management of Data, SIGMOD '16, Jun. 26-Jul. 1, 2016, pp. 253-265, ACM, New York, NY, USA.

Diego Ongaro and John Ousterhout, *In Search of an Understandable Consensus Algorithm (Extended Version)*, Proceedings of the 2014 USENIX Conference on USENIX Annual Technical Conference, USENIX ATC'14, May 20, 2014, pp. 305-320, USENIX Association, Berkeley, CA, USA.

Marta Patiño Martinez et al., *Middle-R: Consistent Database Replication at the Middleware Level*, Transactions on Computer Systems, Nov. 4, 2005, pp. 375-423, vol. 23, Issue 4.

Philip A. Bernstein et al., *Hyder—A Transactional Record Manager for Shared Flash*, 5$^{th}$ Biennial Conference on Innovative Data Systems Research, CIDR '11, Jan. 9-12, 2011, pp. 9-20.

Jeff Terrace and Michael J. Freedman, *Object Storage on CRAQ: High-Throughput Chain Replication for Read-Mostly Workloads*, Proceedings of the 2009 Conference on USENIX Annual Technical Conference, USENIX'09, Jun. 2009, pp. 1-16, USENIX Association, Berkeley, CA, USA.

Robbert Van Renesse and Fred B. Schneider, *Chain Replication for Supporting High Throughput and Availability*, Proceedings of the 6$^{th}$ Conference on Symposium on Operating Systems Design & Implementation, OSDI'04, 2004, 14 pages, vol. 6, USENIX Association, Berkeley, CA, USA.

Guozhang Wang et al., *Building a Replicated Logging System with Apache Kafka*, Proceedings of the VLDB Endowment, Aug. 2015, pp. 1654-1655, vol. 8, Issue 12.

Lintao Zhang et al., *PacificA: Replication in Log-Based Distributed Storage Systems*, Technical report, Feb. 2008, 14 pages.

Sage A. Weil et al., *RADOS: A Scalable, Reliable Storage Service for Petabyte-Scale Storage Clusters*, Proceedings of the 2$^{nd}$ International Workshop on Petascale Data Storage: Held in Conjunction with Supercomputing '07, PDSW '07, 2007, pp. 35-44, ACM, New York, NY, USA.

Avishai Wool, *Quorum Systems in Replicated Databases: Science or Fiction?*, IEEE Computer Society Technical Committee on Data Engineering, 1998, 9 pages, vol. 21, Issue 3.

* cited by examiner

QUORUM-BASED REPLICATION OF DATA RECORDS

BACKGROUND

Both large volumes and abundant types of data have been produced from various application scenarios, such as sensors, smart phones, customer transactions, the Internet of Things (IoTs), and Web clicks. The replication of data records plays an important role in consistency, fault tolerance, scalability, and further impacts the performance. For example, maintaining consistency and durability can cause server scalability problems. The known data record replication approaches, however, have various challenges and difficulties such as performance bottleneck caused by node slowness or node failure.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, module, component, method and/or computer program product embodiments, and/or combinations and sub-combinations thereof, for replicating data records in a cluster of replica nodes.

Figure 1:
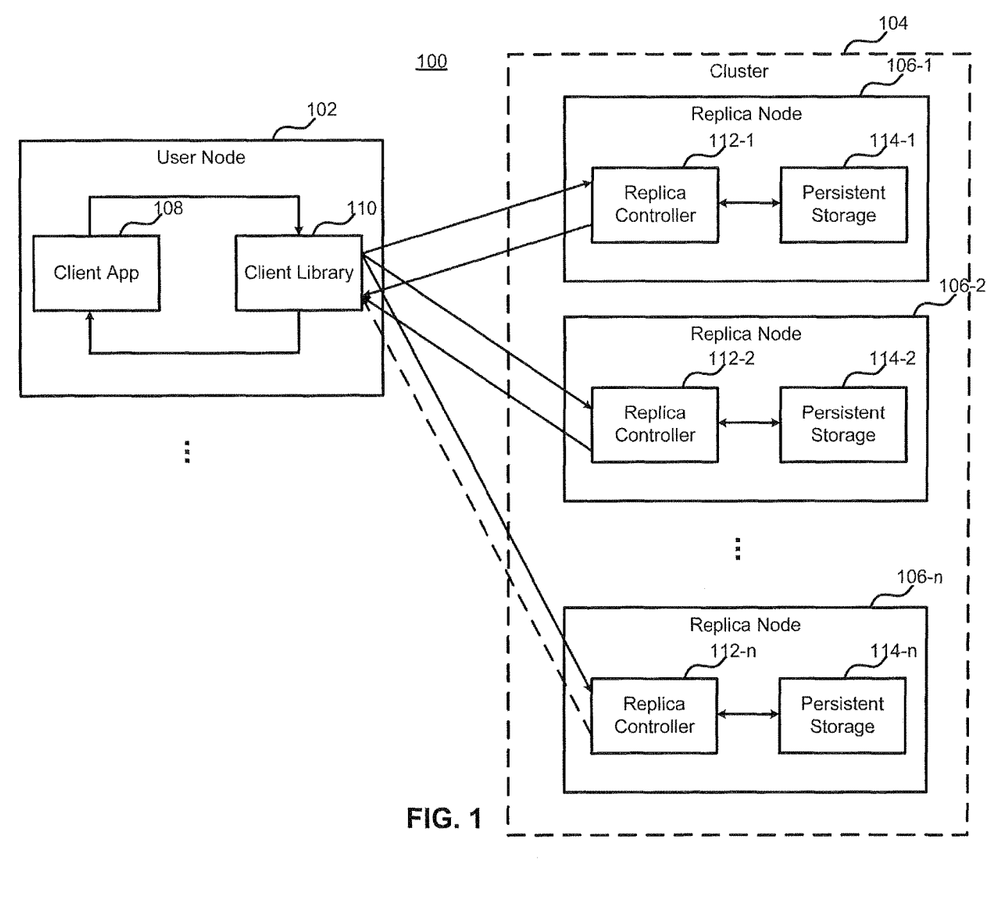
FIG. 1 is a block diagram of a system for quorum-based replication of data records when performing write operations, according to some embodiments.

FIG. 1 is a block diagram of a system 100 for quorum-based replication of data records when performing write operations, according to some embodiments. System 100 may be any centralized or distributed data storage system that includes one or more user nodes 102 and a cluster 104 of replica nodes 106. Various types of data-storage paradigms may be implemented on system 100, such as distributed shared log (Dlog), key-value store, general database, etc. System 100 will be described below with reference with Dlog data-storage paradigm for ease of explanation. However, it is to be appreciated that any other suitable data-storage paradigm, such as the key-value store, may be implemented on system 100 as well. In some embodiments, Dlog may run as a log service in cluster 104. Data records, e.g., log entries, may be partitioned and stored on each replica node 106. In some embodiments, each data record may be associated with a unique identifier. For example, each log entry may have a globally unique log sequence number (LSN) that is decided by a sequencer (not shown) when writing a log entry.

As shown in FIG. 1, each user node 102 may be a client host that includes at least a client application 108 and a client library 110. Client application 108 may be any application that can initiate an operation, for example, a write operation or a read operation, on any data records in client library 110. Client library 110 may be local storage on the same machine as client application 108. In some embodiments, client library 110 may be operatively coupled to each replica node 106 of cluster 104, for example, via any suitable network connections, to replicate local data records on each replica node 106 of cluster 104. It is to be appreciated that additional logic may be included in user node 102 or as part of client library 110 to control and manage any data record operations, as will be described below in detail.

Each replica node 106 may be a server that includes at least a replica controller 112 and a persistent storage 114. Persistent storage 114 (a.k.a. non-volatile storage) may be any data-storage device that retains data after power to that device is shut off, such as hard disk drives and solid-state drives. Replica controller 112 may be operatively coupled to client library 110 and may control and manage the replication of data records on the respective replica node 106. For example, replica controller 112 may determine whether and when a new replicated record becomes "durable," i.e., being written into persistent storage 114. Replica controller 112 may also determine whether and when to commit a new replicated record to make it "visible" so that the value of the record can be read by user node 102. As will be described below in detail, replica controller 112 may also control and manage message exchange between replica nodes 106 of cluster 104 (e.g., acting as a broadcaster node) to facilitate each replica node 106 to update the commitment status of each replicated record stored in persistent storage 114. It is to be appreciated that data replication may be independent of how the data is stored. In some embodiments, replica node 106 may store the data in memory and persistent storage 114. In some embodiments, replica node may store the data in memory only.

In this example embodiment, write operations can be performed by system 100. In operation, client application 108 may initiate a write request to client library 110 for writing a value of a new record. For example, the write request may be represented as write(1, A), meaning to write the value "A" at LSN 1 in a Dlog client library. In response to the write request, client library 110 may issue a write request for writing the value of the record onto each replica node 106 of cluster 104. For example, the write request may be represented as write(1, A), meaning to write the value "A" at LSN 1 in respective persistent storage 114 of each replica node 106. As shown in FIG. 1, the same write request may be transmitted from user node 102 to each replica node 106-1, 106-2, . . . , 106-n of cluster 104. On each replica node 106, respective replica controller 112 may try to write the value of the record into respective persistent storage 114 to make the record durable. Because it is unknown for each replica node 106 whether the same replicated record is durable in other replica nodes of cluster 104, even if one replica node has made the record durable in the persistent storage, the replica node may set the commitment status of the record as "in-doubt," as opposed to "visible." For example, each replica node 106 may make the record at LSN 1 durable in respective persistent storage 114 and set the commitment status of the record at LSN 1 as "in-doubt."

In this embodiment, replica controllers 112 of each replica node 106 on which the replicated record is durable may transmit acknowledgements to user node 102. For example, the acknowledgement from replica node 106-1 may indicate that the value "A" has been successfully persisted in persistent storage 114-1. Due to node slowness, network failure, or node failure, some replica nodes may not transmit the acknowledgements to user node 102 or later than other replica nodes. For example, assuming cluster 104 includes three replica nodes 106-1, 106-2, and 106-n, two replica nodes 106-1 and 106-2 may transmit the acknowledgements faster than replica node 106-n. User node 102 may determine whether the number of acknowledgements received from cluster 104 exceeds a threshold (e.g., a majority quorum) in order to commit the write operation in client library 110. In some embodiments, the threshold may be 50% of the total number of replica nodes 106 in cluster 104. For example, if the acknowledgements from two replica nodes 106-1 and 106-2 are received by user node 102, user node 102 may commit the write operation write(1, A) in client library 110. An acknowledgement of the successful write operation may be sent by client library 110 to client application 108 from which the write request is initiated.

It is to be appreciated that user node 102 may not need to wait for acknowledgements from all replica nodes 106 of cluster 104 in order to commit the write operation. Instead, as long as the number of acknowledgements received from cluster 104 exceeds the threshold, the write operation can be committed on user node 102, and any further acknowledgements from the rest of replica nodes 106 can be ignored. For example, the acknowledgement from replica node 106-n becomes unnecessary for user node 102 once the acknowledgements from replica nodes 106-1 and 106-2 (two out of three replica nodes) have been received by user node 102. The "write-quorum" scheme implemented by system 100 as described above can achieve good availability and reduce latency because failed or slow replica nodes are no longer the bottleneck of write operations. Also, in some embodiments, the "write-quorum" scheme does not require a second round of communication between user node 102 and each replica node 106 in order to commit the replicated record on each replica node 106. Instead, the commitment status of the durable record may be set as "in-doubt" on respective replica node 106. This can further improve the write performance of system 100. As will be described below in detail, the commitment of the durable record on each replica node 106 may be achieved by the commitment status message exchange scheme implemented by cluster 104.

Code Listing 1 below illustrates one example of an algorithm implemented by user node 102 for read and write operations. Code Listing 2 below illustrates one example of an algorithm implemented by replica node 106 for read and write operations. However, in other embodiments, user node 102 and replica node 16 can implement other code/pseudo code/algorithms. In this example, line 4 of Code Listing 1 shows the protocol on user node 102 for a write operation in Dlog using the "write-quorum" scheme described above, and line 1 of Code Listing 2 shows the protocol on replica node 106 for a write operation in Dlog using the "write-quorum" scheme. Specifically, a write operation may send the request to some or all replica nodes, and the write operation succeeds as long as the record is durable on the majority of the replica nodes (see line 8 of Code Listing 1, write quorum). In addition, if successful replica nodes on which the record is durable are less than quorum, Dlog can "repair write" the record at the LSN until the record on the majority of replica nodes becomes durable (see line 14 of example Code Listing 1). Because the record at the LSN may be assigned once, the repair writer (e.g., replica node 106) and original writer (e.g., user node 102) may not conflict even though they are writing the same value. For example, line 38 of Code Listing 2 shows an example of overwrite. In some embodiments, the repair function may return true directly if the record is already durable. The linearizable point of the write operation—informally the time point when the write operation commits—may be the time point when quorum of replica nodes are durable. In particular, any read issued after that point should see the written log entry; any read returned before the time point should not return the written log entry.

---

Algorithm 1: client-lib procedures

```
    Data: R: replication group.
1   Procedure Read(lsn)
2      node n: randomly node chosen from R
3      return ReadRPC(lsn) from n
4   Procedure Write (lsn, payload)
5      parallel-for n ∈ R do
6         WriteRPC(lsn, payload)
7      if Majority response success then
8         return success
9      else if no success then
10        return fail
11     else
12        F: set of failed nodes
13        return RepairWrite(lsn, payload, F)
14  Procedure RepairWrite(lsn, payload, P: set of nodes)
15     while F is majority of R do
16        parallel-for n ∈ F do
17           Repair (lsn, payload)
18           if success then
19              remove n from F
20     return success
21  Procedure Fill(lsn)
22     parallel-for n ∈ R do
23        Prepare (lsn)
24     if all prepared then
25        parallel-for n ∈ R do
26           CommitFill(lsn)
27        return success
28     else
29        parallel-for n ∈ R do
30           Abort (lsn)
31        return fail
```

Code Listing 1: Non-limiting example pseudo code for read and write operations on user node

---

Algorithm 2: server-side requests handlers

```
    Data: R: replication group.
    for each lsn < status, data, visible, false, >
1   Procedure WriteRPC(lsn, payload)
2      if status = written and data = payload then
3         return success
4      if status = (written|filled|prepare) then
5         return fail
6      data = payload ; status = written ;
7      return success
8   Procedure ReadRPC(lsn)
9      if visbile = false then
10        wait for 2 rounds of gossip, until visbile changes
              or time-out
```

| Algorithm 2: server-side requests handlers | | |
|---|---|---|
| 11 | if wait time-out then | |
| 12 |     return ReadAll(lsn) | |
| 13 | if visbile = false then | |
| 14 |     return not_written | |
| 15 | if visbile = ambigous then | |
| 16 |     return ReadAll(lsn) | |
| 17 | if status = (written\|filled) then | |
| 18 |     return data | |
| 19 | else | |
|  |     /* visible but local unavailable | */ |
| 20 |     forward request to another replica n (n ∈ R) | |
| 21 | Procedure ReadAll(lsn) | |
| 22 |     parallel-for n ∈ R do | |
| 23 |         GetMetaData(lsn) | |
|  |     /* returns evaluated by conditions below | */ |
| 24 |     if no payload returned then | |
| 25 |         return Fill(lsn) | |
| 26 |     data = payload returned | |
| 27 |     if majority written or anyone visible then | |
| 28 |         visible = true | |
| 29 |         return data | |
| 30 |     if majority not written then | |
| 31 |         return not_written | |
| 32 |     RepairWrite (lsa, data, {nodes without payload}) | |
| 33 |     return data | |
| 34 | Procedure GetMetaData(lsn) | |
| 35 |     if status = written then | |
| 36 |         return < status, data, visible > | |
| 37 |     return < status, visible > | |
| 38 | Procedure Repair (lsn, payload) | |
| 39 |     data = payload ; status = written ; | |
| 40 |     return success | |

Figure 2:
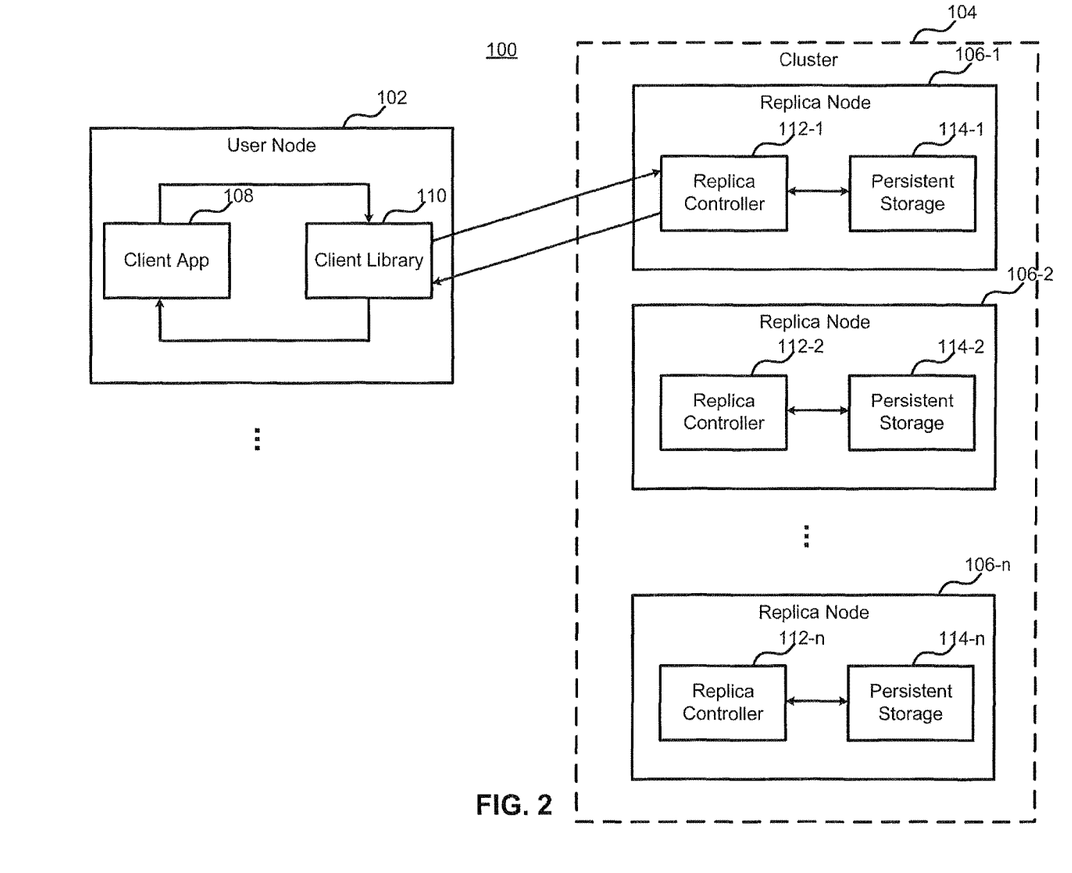
FIG. 2 is a block diagram of a system for quorum-based replication of data records when performing read operations, according to some embodiments.

Code Listing 2: Non-limiting example of pseudo code for read and write operations on replica node FIG. 2 is a block diagram of system 100 for quorum-based replication of data records when performing read operations, according to some embodiments. In this embodiment, read operations can be performed by system 100. In operation, client application 108 may initiate a read request to client library 110 for reading a record. For example, the read request may be represented as read(1), meaning to read the value at LSN 1 in a Dlog client library. In response to the read request, client library 110 may issue a read request for reading the value of the record from one of replica nodes 106 of cluster 104. For example, the read request may be represented as read(1), meaning to read the value at LSN 1 in persistent storage 114 of the chosen replica node. The replica node to which the read request is transmitted may be determined arbitrarily, such as to balance read load across replica nodes 106 in cluster 104 or based on network locality of each replica node 106 with respect to user node 102. It is to be appreciated that the read operation may be initiated by any user node 102 of cluster 104, which may be the same user node that initiates the write operations as described above with respect to FIG. 1 or a different user node. In other words, each user node 102 of cluster 104 may initiate write and/or read operations.

In this embodiment, the read request may be transmitted to replica node 106-1 and received by replica controller 112-1 of replica node 106-1. In response to receiving the read request, replica controller 112-1 may retrieve the value of the record from persistent storage 114-1. For example, replica controller 112-1 may read the value "A" at LSN 1 in persistent storage 114. It is to be appreciated that in some embodiments, the record of interest may be temporarily stored in a memory cache to increase the access speed and thus, may be read by replica controller 112-1 from the memory cache. Replica controller 112-1 may further check the commitment status of the record to see whether the record is committed. As described above, the initial commitment status of a replicated record after being written on replica node 106 may be "in-doubt." The "write-quorum" scheme described herein may not involve a second round of communication to commit the replicated record on each replica node 106. Instead, the commitment status message exchange scheme between replica nodes 106 of cluster 104 may facilitate each replica node 106 to commit durable records, e.g., updating the commitment status to "visible." In this embodiment, assuming that the commitment status associated with the retrieved record is "visible," replica controller 112-1 thus may transmit the value of the record to user node 102. For example, the value "A" at LSN 1 may be transmitted by replica controller 112-1 to client library 110. Client library 110 then may return the received value of the record to client application 108.

Figure 3:
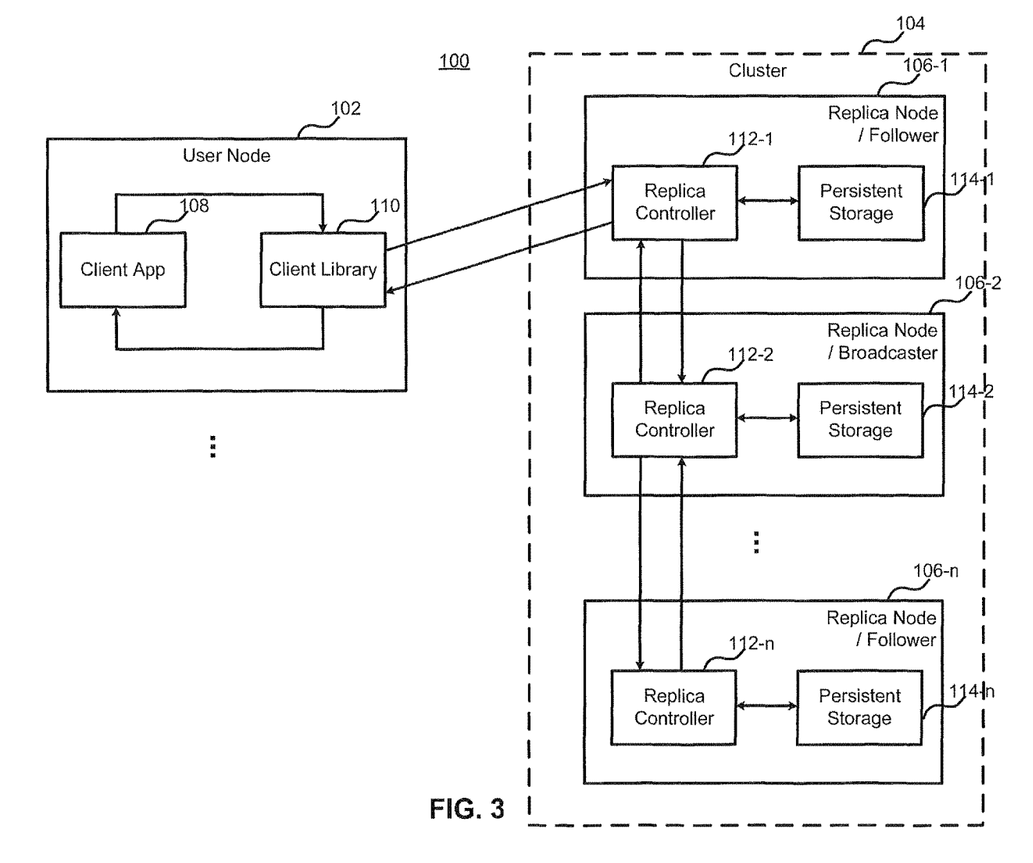
FIG. 3 is a block diagram of a system for quorum-based replication of data records when performing read operations and message exchange in a cluster, according to some embodiments.

FIG. 3 is a block diagram of system 100 for quorum-based replication of data records when performing read operations and message exchange in cluster 104, according to some embodiments. As described above, the "write-quorum" scheme described herein may not commit replicated records on each replica node 106. Instead, messages may be exchanged in cluster 104 to facilitate each replica node 106 to update the commitment status of each replicated records stored thereon. As shown in FIG. 3, replica node 106-2 may be arbitrarily chosen as the broadcaster node, and the rest of replica nodes 106-1 and 106-3 may act as the follower nodes. Messages may be continuously propagated and exchanged within cluster 104. In some embodiments, there may be multiple message exchange groups in cluster 104, which can work in parallel independently to provide redundant for fault tolerance.

In this embodiment, replica controller 112-1 may determine that the record retrieved from persistent storage 114-1 (or the memory cache) is not committed, for example, based on the commitment status associated with the record (e.g., "in-doubt"). As a result, replica controller 112-1 cannot return the value of the record. Instead, replica controller 112-1 may wait for an update message indicative of whether the number of replica nodes 106 on which the same replicated record is durable exceeds the threshold (e.g., a quorum). As shown in FIG. 3, replica node 106-2 may act as the broadcaster node of cluster 104. The broadcaster node may transmit an inquiry message requesting the durable status of each replicated record (e.g., which records are durable) from each replica node 106 of cluster 104. Each follower node, i.e., replica nodes other than the broadcaster node, in response to receiving the inquiry message, may return a response indicative of which records are durable on the respective follower node to the broadcaster node.

The broadcaster node then may determine the commitment status of each replicated record based on the responses received from the follower nodes, as well as the durable status of each replicated record on the broadcaster node itself. The broadcaster node may transmit the update message to each follower node so that each follower node can learn from the update message that the commitment status of each replicated record. For example, for the record at LSN 1, the two follower nodes (replica nodes 106-1 and 106-n) may both return the status of "durable." The broadcaster node (replica node 106-2) then may count the number of replica nodes on which the same replicated record at LSN 1 is durable as three (including the broadcaster node itself) and then transmit the update message including such information to the two follower nodes. Because the number of durable replica nodes for the replicated record at LSN 1 exceeds the threshold (e.g., 50% for example), each follower node may commit the record and set the commitment status as "visible." The message exchange scheme described above may be repeated in cluster 104 to keep prorogating the commitment status information of replicated records within cluster 104.

For replica node 106-1, in response to receiving the update message from replica node 106-2, replica controller 112-1 may determine that the number of durable replica nodes for the requested record exceeds the threshold and thus, transmit the value of the record retrieved from persistent storage 114-1 to user node 102. For example, the value "A" at LSN 1 may be transmitted by replica controller 112-1 to client library 110. Client library 110 then may return the received value of the record to client application 108.

Referring to the example, non-limiting Code Listings 1 and 2 described above, line 1 of Code Listing 1 shows an example protocol for read operations initiated by user node 102. In this example, the replica node to which the read request is transmitted may be randomly chosen from cluster 104. Line 8 of Code Listing 2 shows an example protocol for handling the read request on replica node 106. The visibility of a write operation may be reconciled using the message exchange scheme described above, for example, as shown in lines 9-12 of Code Listing 2. In this example, when a write is reconciled visible, the record may be stored with a quorum bit to indicate its commitment status (named visible in Code Listing 2 for the LSN). A read operation for an LSN can read-one from a local persistent storage (e.g., SU) if the quorum bit is set true (see line 9 of Code Listing 2). In some embodiments, if the LSN is durable on the majority of replicate nodes, but the replicate node handling the read is missing the LSN, then the read request may be forwarded to another replica node.

Code Listing 3 below illustrates one example of an algorithm implemented by a follower node for exchanging messages with a broadcaster node. Code Listing 4 below illustrates one example of an algorithm implemented by the broadcaster node for exchanging messages with the follower nodes. However, in other embodiments, the follower nodes and broadcaster node can implement other code/pseudo code/algorithms.

---
Algorithm 1: gossip protocol: follower
---

```
Data: R: replication group;
current gossip round = i ;
each lsn < stayus, visible : false, broadcast : false >;
OutMsg: < rid, watermark : min invisible lsn, W :
  written set, I : interest set >
InMsg: < rid, watermarkF : fully replicated, D :
  durable - quorum set, A : ambiguous, I ; interest >
1   Procedure Follower(InMsg)
2       garbage collect metadata below watermarkF
3       for lsn in D do
4           visible = true; broadcast = true
5           if status != written then
6               I.add(lsn)
7       for lsn in A do
8           visible = ambiguous;
9       watermark = min invisible lsn
10      W = {lsn|∀(status = written ∧ broadcast = false)}
11      i = InMsg.rid; OutMsg.rid = i;
12      return OutMsg
```

Code Listing 3: Non-limiting example of pseudo code for message exchange on follower node ---
Algorithm 2: gossip protocol: broadcast
---

Data: R: replication group.

---
Algorithm 2: gossip protocol: broadcast
---

```
for each lsn < visible, list : set of written nodes >
current gossip round i
InMsg; same as OutMsg in algo 1
OutMsg; same as InMsg in lago 1
1    Procedure Broadcaster(rsps: set of InMsgs)
2        watermarkF = Min(InMsg.watermark ∈ rsps)
3        for InMsg in rsps from f do
4            for lsn in InMsg.I do
5                list.add(f)
6            for lsn in InMsg.I do
7                I.add(lsn, list.anyone( ))
         /* number of missing follower msg       */
8        missing = |R| - |rsps|
9        for lsn in InMsg.W, InMsg ∈ rsps do
10           if list.size( ) ≥ quorum then
11               D.add(lsn)
12           else if list.size( ) + missing ≥ quorum then
13               A.add(lsn)
14       i++ : OutMsg.rid =
15       return OutMsg
```

Code Listing 4: Non-limiting example of pseudo code for message exchange on broadcaster node The example of Code Listings 3 and 4 shows messages exchanged between the follower nodes and the broadcaster node, such as inquiry messages, responses, and update messages. In this example, when reading an LSN with an in-doubt quorum bit, a replica node may use messages to reconcile the visibility of the LSN. For example, a follower node may get the following information from messages from the broadcaster node: (1) durable-quorum: set of LSNs durable on the majority of replica nodes; (2) durable-not-quorum: set of LSNs durable on the minority of replica nodes; (3) ambiguous set: in failure scenario, it is possible to have ambiguous results when some replica nodes do not respond; (4) interest: used to help a replica node requests location of LSNs, to catch up with missing LSNs; (5) fully replicated watermark: an LSN below which all LSNs are fully durable on all replica nodes, and the replication metadata for LSNs below fully replicated watermark can be garbage collected; and (6) an indication of how up to date the information used to calculate (1)-(5) is, for example, in terms of number of broadcast rounds. In some embodiments, the size of a message may be reduced by using a compact presentation of the sets described above. For example, watermark i may be used to present all LSNs less than i, and range [i, j] may be used to present all LSNs between i and j. In another example, because durable-not-quorum is a complementary set of durable-quorum set and ambiguous set and thus, may not be included in the message if the durable-quorum and ambiguous sets are included.

In the example illustrated in Code Listings 3 and 4, the broadcaster node may broadcast messages with a round number that denotes which round this broadcast is in. The follower nodes then may learn the visibility of LSN from the broadcast (see lines 3-9 of Code Listing 3). The follower nodes may report the set of in-doubt LSNs to the broadcaster node (see lines 10 of Code Listing 3). Then the broadcaster node may recalculate the messages (see Code Listing 4) and broadcast the next round of messages. It is to be appreciated that the message exchange scheme described in this example use majority durable (quorum) to make the visible decision, which can tolerate slow or failed nodes automatically.

In this example, when a replica node receives a read request for a visibility in-doubt LSN, the visibility can be reconciled using a number of broadcast rounds. If the LSN is not in the durable-quorum set or ambiguous set after waiting for the broadcast round following one which indicates that the broadcaster is up-to-date with respect to the replica as of the start time of the read request, the replica node may return the user node that the LSN is invisible. Although a replica node can wait for a broadcast round that definitively determines the visibility of an LSN, in some embodiments, a replica node may fallback after a timeout to read all replica nodes to figure out the visibility on its own. On example of the read-all function is shown in line 21 of Code Listing 2. The LSN may be also in an ambiguous situation in the read-all result, if some replica nodes crash. For example, being durable on five replica nodes—one is crashed, two are durable, and the other two are not durable—an LSN is neither quorum-durable nor quorum-not-durable. In case of ambiguous, a write-repair function (see line 32 of Code Listing 2) may be used to help the LSN durable to the majority of replica nodes. For example, the values from the durable replica nodes (with CRC integrity checking) may be read first and written to the not-durable replica nodes.

Figure 4:
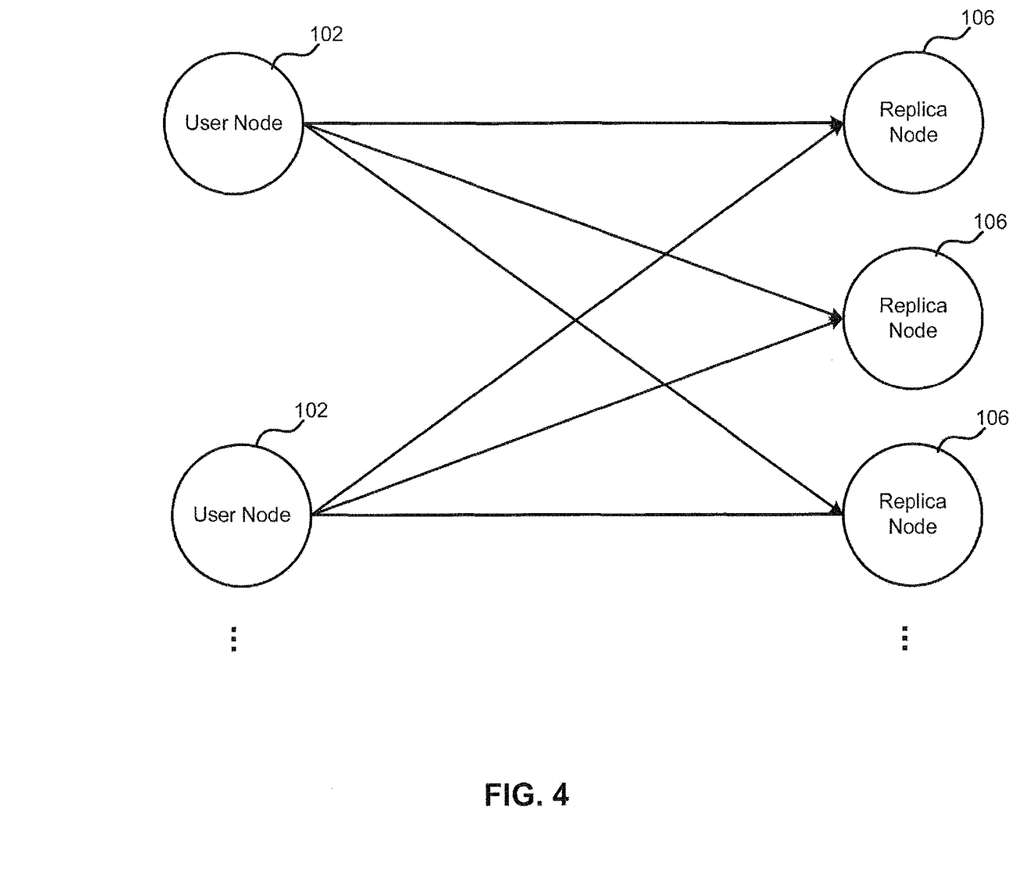
FIG. 4 illustrates an example distributed update scheme, according to some embodiments.

FIG. 4 illustrates a distributed update scheme, according to some embodiments. As shown in FIG. 4, each user node 102 may write directly to each replica node 106 without an intermediate node managing the write requests. Concurrency of writing can be handled externally, e.g., by a sequencer, to ensure that two user nodes 102 cannot write at the same position of records. For example, for write-write contention safety, a sequencer may be used because a sequencer may only assign an LSN to one user node 102. System 100 may also perform a fill operation at an LSN in order to make progress, e.g., if user node 102 crashes or is too slow to write log entries. A fill operation behaves like a write at the LSN and prevents a subsequent write from succeeding at the LSN. For write-fill contention safety, a fill may need to reach all replica nodes 106 to be successful, while a write needs only to reach the threshold (e.g., majority quorum) to be successful. Each replica node 106 may provide "write-once" semantics so that if the first write to a position is durable, then a second write to the same position is rejected. An example of a fill function is illustrated in line 21 of Code Listing 1 on user node 102.

Figure 5:
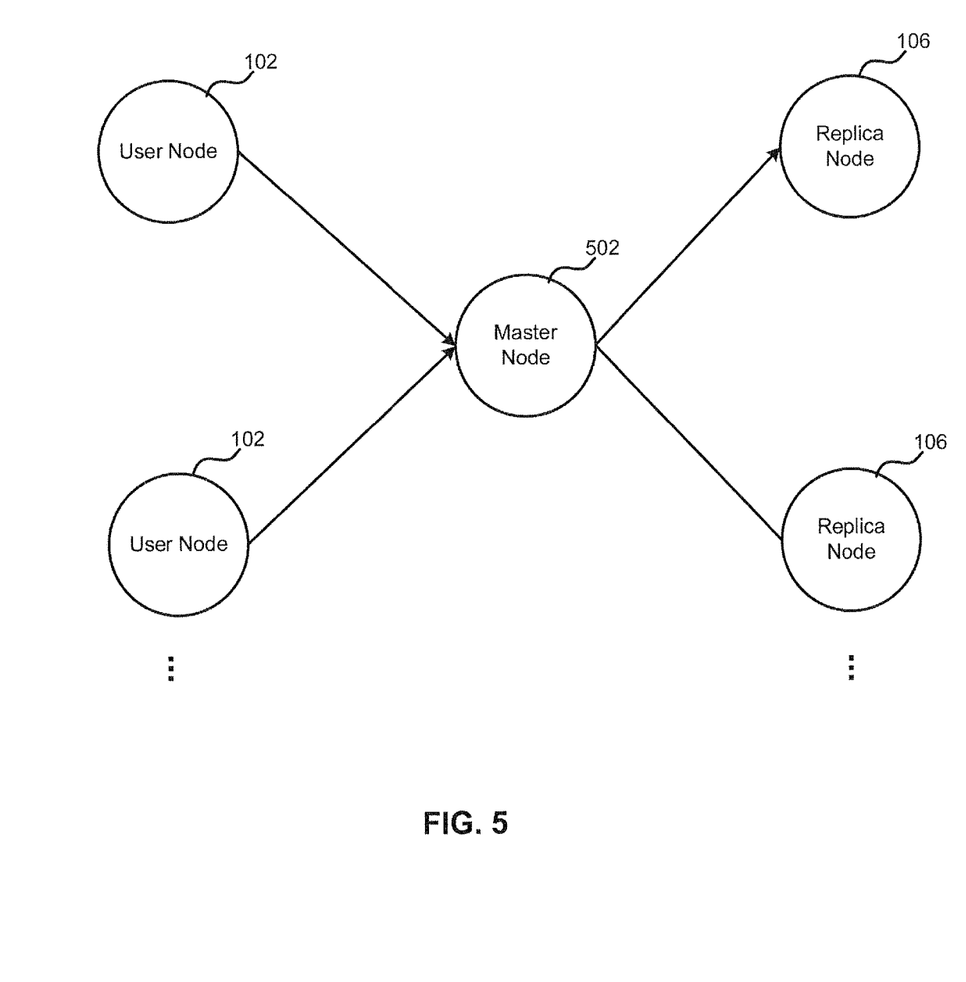
FIG. 5 illustrates an example centralized update scheme, according to some embodiments.

FIG. 5 illustrates a centralized update scheme, according to some embodiments. In some embodiments, write requests from user node 102 may be transmitted to a dedicated node, referred as a master node 502, which replicates the write requests to each replica node 106. Master node 502 may resolve concurrency issues by applying the "write-once" semantics so that if the first write to a position is durable, then a second write to the same position is rejected. In some embodiments, master node 502 may be an arbitrarily-chosen replica node 106 of cluster 104.

Figure 6:
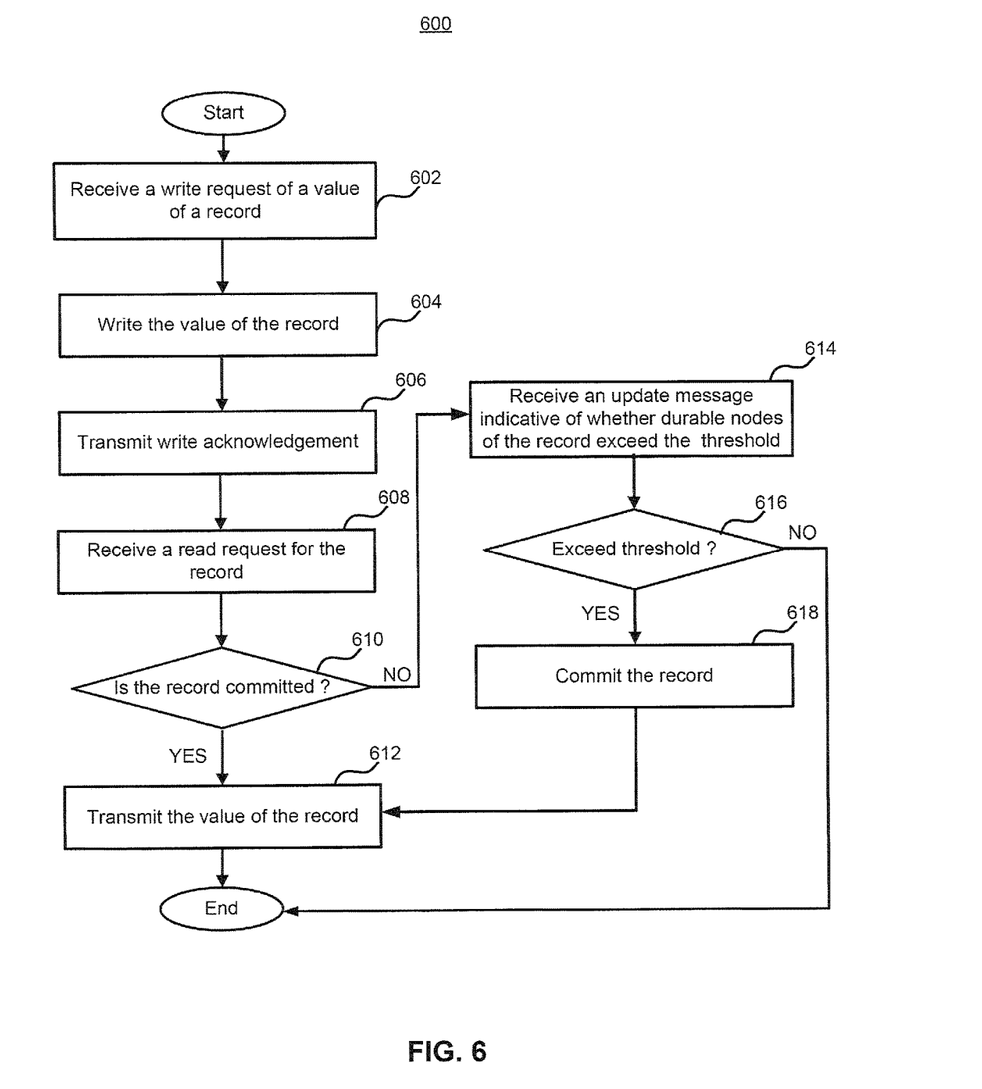
FIG. 6 is a flowchart for a method for quorum-based replication of data record, according to some embodiments.

FIG. 6 is a flowchart for a method for quorum-based replication of data record, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-3. However, method 600 is not limited to that example embodiment. In 602, replica node 106 receives a write request of a value of a record. The same write request may be transmitted to each replica node 106 of cluster 104 by user node 102. In 604, replica node 106 writes the value of the record. The value of the record may be written into persistent storage 114 of replica node 106 to make the record durable. In 606, replica node 106 transmits a write acknowledgement of making the record durable to user node 102. User node 102 may commit the write request in response to receiving write acknowledgements from the number of replica nodes 106 that exceeds the threshold (e.g., majority quorum).

In 608, replica node 106 receives a read request for the record from user node 102 (which may be the same as or different from user node 102 transmitting the write request in 602). In 610, replica node 106 determines whether the record is committed. If the record is committed, then in 612, replica node 106 transmits the value of the record to user node 102. The transmission may be performed without receiving an update message from a master node in cluster 104. If the record is found not to be committed in 610, then in 614, replica node 106 receives an update message indicative of whether the number of durable replica nodes of the record exceeds the threshold. For example, the threshold may be 50% of the total number of replica nodes 106 in cluster 104 (i.e., majority quorum). In 616, replica node 106 determines whether the number of durable replica nodes exceeds the threshold. If the threshold is exceeded, in 618, replica node 106 commits the record; otherwise the method 600 ends. In 612, replica node 106 transmits the value of the committed record to user node 102. In some embodiments, if the value of the record is unavailable on replica node 106, replica node 106 may forward the read request to another replica node of cluster 104.

Figure 7:
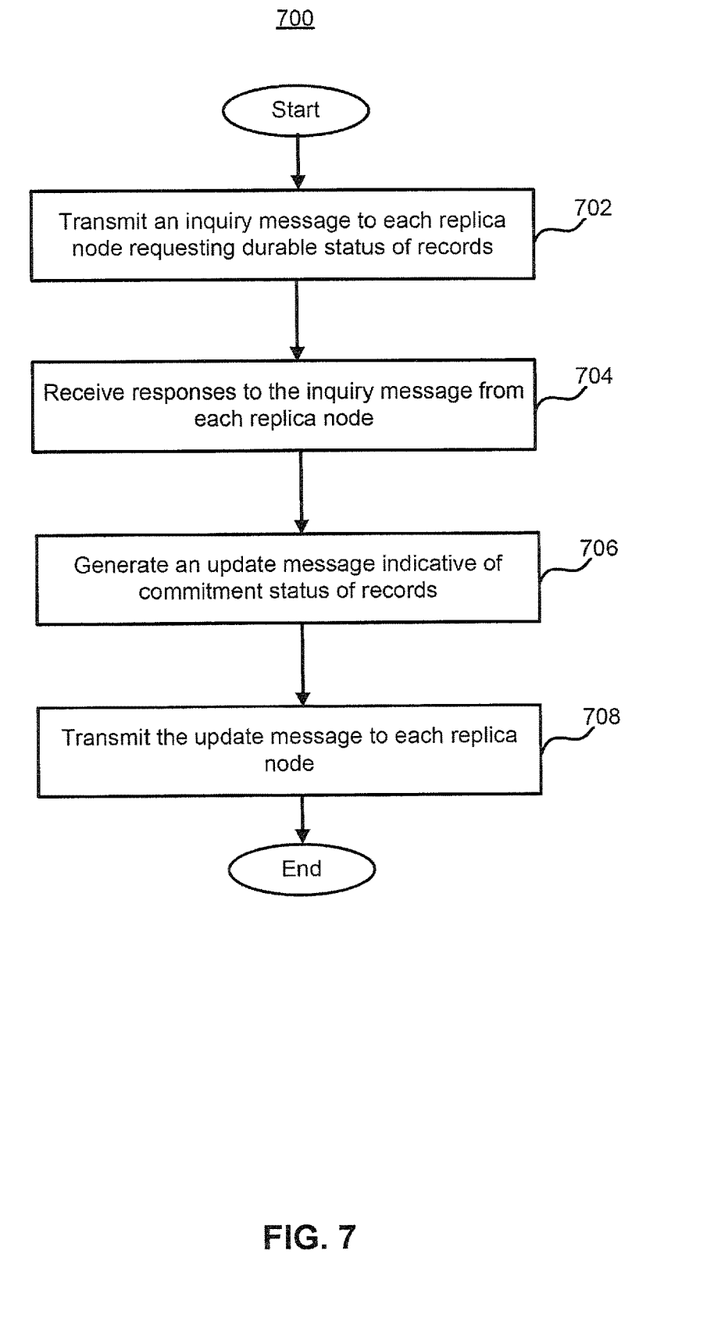
FIG. 7 is a flowchart for a method for message exchange in a cluster of replica nodes, according to some embodiments.

FIG. 7 is a flowchart for a method for message exchange in a cluster of replica nodes, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 1-3. However, method 700 is not limited to that example embodiment. In 702, a broadcaster node transmits an inquiry message to each replica node (follower nodes) requesting which records are durable on the respective follower node. In 704, the broadcaster node receives responses to the inquiry message from each replica node. It is to be appreciated that in some embodiments, one or more replica nodes may not respond in time due to latency or node failure. In 706, the broadcaster node generates an update message indicative of the commitment status of each replicated record in cluster 104 based on the responses received from the replica nodes (and may include the durable status of each replicated record on the broadcaster node itself). In 708, the broadcaster node transmits the update message to each replica node 106.

Figure 8:
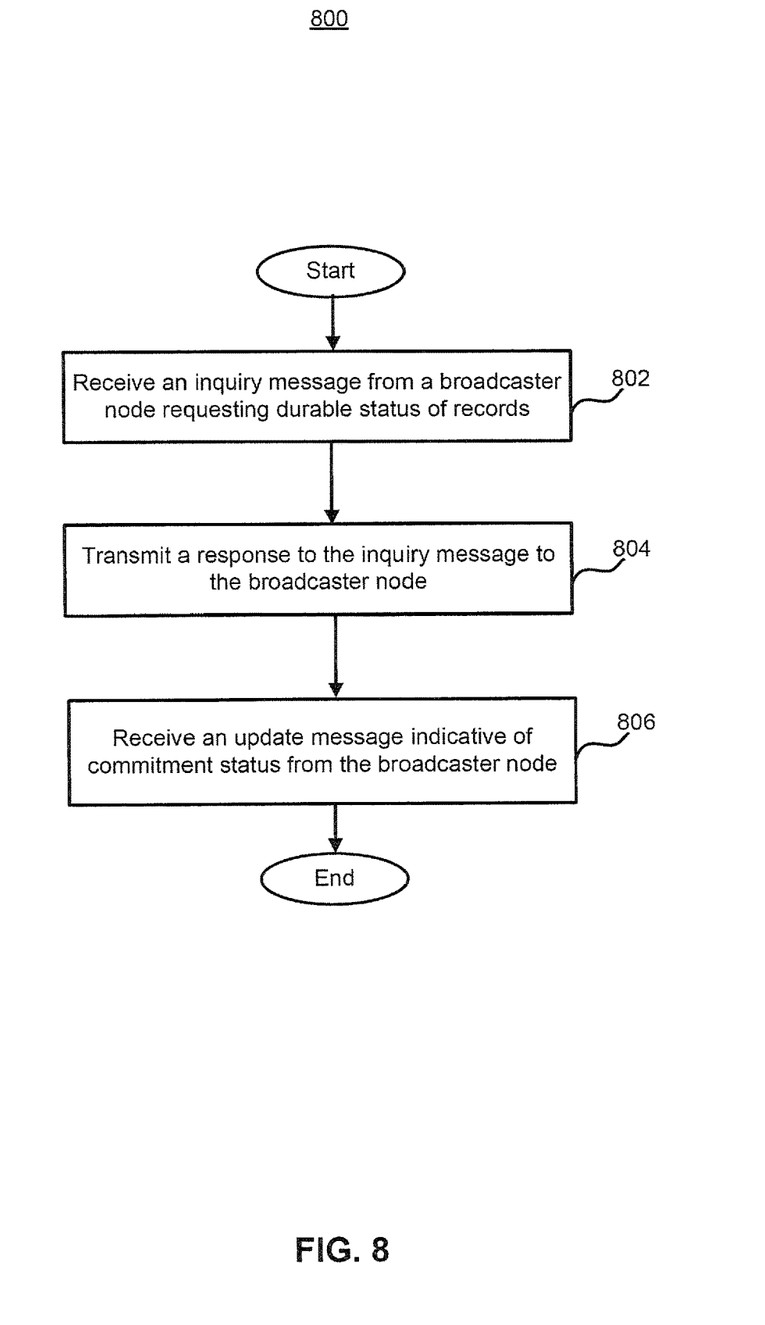
FIG. 8 is a flowchart for another method for message exchange in a cluster of replica nodes, according to some embodiments.

FIG. 8 is a flowchart for another method for message exchange in a cluster of replica nodes, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIGS. 1-3. However, method 800 is not limited to that example embodiment. In 802, replica node 106 (follower node) receives the inquiry message from the broadcaster node requesting which records are durable on the respective follower node. In 804, the follower node transmits a response to the inquiry message to the broadcaster node. In 806, the follower node receives the update message indicative of commitment status of records from the broadcaster node.

Figure 9:
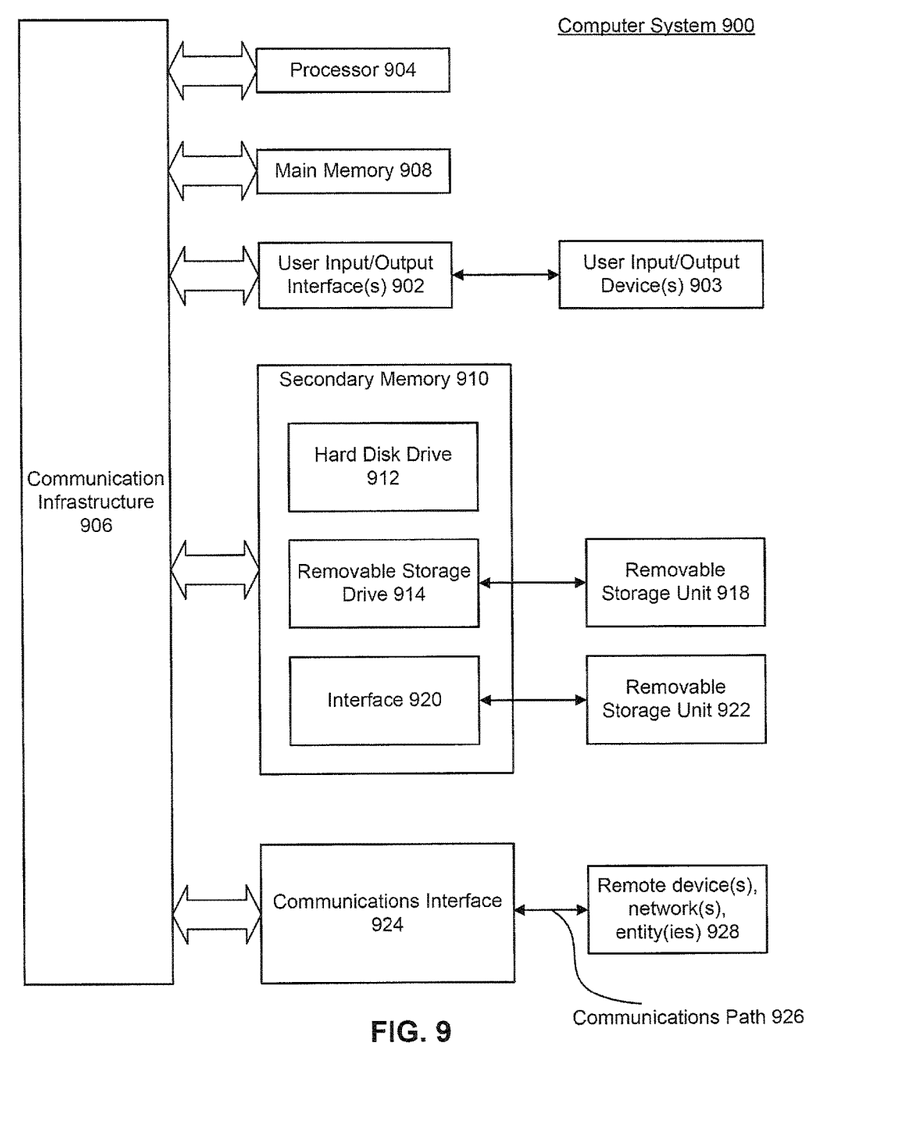
FIG. 9 is an example computer system useful for implementing various embodiments.

Various embodiments can be implemented, for example, using one or more computer systems, such as computer system 900 shown in FIG. 9. One or more computer system 900 can be used, for example, to implement method 600 of FIG. 6, method 700 of FIG. 7, and method 800 of FIG. 8. For example, computer system 900 can perform quorum-based replication, as well as message exchange in a cluster of replica nodes according to some embodiments. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the present disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

What is claimed is:

1. A computer implemented method, comprising:
   receiving, from a first user node, by at least one processor, a read request to read a record on a first replica node of a cluster of replica nodes;
   retrieving, by the at least one processor, a commitment status associated with the record on the first replica node of the cluster, wherein the commitment status indicates that the record on the first replica node of the cluster is ambiguous or in doubt;
   determining, based on the commitment status, by the at least one processor, that the record is not committed on the first replica node of the cluster;
   in response to the determining, receiving, from a second replica node of the cluster, by the at least one processor, an indication that the record is stored on a number of replica nodes of the cluster that include durable status for the record, wherein the number exceeds a threshold;
   in response to the indication, transmitting, to the first user node, by the at least one processor, a value of the record on the first replica node;
   further in response to the indication, updating, by the at least one processor, the commit status associated with the record on the first replica node of the cluster; and
   in response to the updating, sending, by the at least one processor, the updated commit status to another replica node of the cluster.

2. The method of claim 1, further comprising:
   in response to determining that the record is committed on the first replica node, transmitting, to the first user node, by the at least one processor, the value of the record on the first replica node.

3. The method of claim 1, wherein the threshold is a predetermined percentage of the total number of replica nodes in the cluster.

4. The method of claim 1, further comprising:
   receiving, from a second user node, by the at least one processor, a write request to write the value of the record on the first replica node, wherein the write request is transmitted to each replica node of the cluster;
   writing, by the at least one processor, the value of the record in a persistent storage on the first replica node; and
   transmitting, to the second user node, by the at least one processor, an acknowledgement of making the record durable on the first replica node.

5. The method of claim 4, further comprising:
   committing, by the at least one processor, the write request in response to receiving a plurality of acknowledgements, from a corresponding plurality of replica nodes of the cluster, that the record has been made durable on the corresponding plurality of replica nodes of the cluster, wherein a quantity of the acknowledgments exceeds the threshold.

6. The method of claim 4, wherein the write request is received by the first replica node from the second user node directly.

7. The method of claim 1, further comprising:
   receiving, from the second replica node, by the at least one processor, an inquiry message requesting records on the first replica node for which the first replica node indicates durable status, wherein the inquiry message is broadcast to a plurality of replica nodes of the cluster; and
   transmitting, to the second replica node, by the at least one processor, a response to the inquiry message indicative of which records have durable status on the first replica node, wherein the update message is based, at least in part, on the responses received from the replica nodes of the cluster by the second replica node.

8. The method of claim 1, further comprising:
   in response to the determining, committing, by the at least one processor, the record on the first replica node.

9. The method of claim 1, further comprising:
   processing, by the at least one processor, a further read request to read a second record; and
   in response to the value of the second record being unavailable on the first replica node, forwarding, by the at least one processor, the further read request to a third replica node of the cluster.

10. A system, comprising:
    a memory; and
    at least one processor coupled to the memory and configured to:
    receive, from a first user node, a read request to read a record on a first replica node of a cluster of replica nodes;
    retrieve a commitment status associated with the record on the first replica node of the cluster, wherein the commitment status indicates that the record on the first replica node of the cluster is ambiguous or in doubt;
    perform, based on the commitment status, a determination that the record is not committed on the first replica node of the cluster;
    in response to the determination, receive, from a second replica node of the cluster, an indication that the record is stored on a number of replica nodes of the cluster that include durable status for the record, wherein the number exceeds a threshold;
    in response to the indication, transmit, to the first user node, a value of the record on the first replica node;
    further in response to the indication, update the commit status associated with the record on the first replica node of the cluster; and
    in response to the updating, send the updated commit status to another replica node of the cluster.

11. The system of claim 10, wherein the at least one processor is further configured to:
    in response to determining that the record is committed on the first replica node, transmit, to the first user node, the value of the record on the first replica node.

12. The system of claim 10, wherein the threshold is a predetermined percentage of the total number of replica nodes in the cluster.

13. The system of claim 10, wherein the at least one processor is further configured to:
   receive, from a second user node, a write request to write the value of the record on the first replica node, wherein the write request is transmitted to each replica node of the cluster;
   write the value of the record in a persistent storage on the first replica node; and
   transmit, to the second user node, an acknowledgement of making the record durable on the first replica node.

14. The system of claim 13, wherein the at least one processor is further configured to commit the write request in response to receiving a plurality of acknowledgements, from a corresponding plurality of replica nodes of the cluster, that the record has been made durable on the corresponding plurality of replica nodes of the cluster, wherein a quantity of the acknowledgments exceeds the threshold.

15. The system of claim 13, wherein the write request is received by the first replica node from the second user node directly.

16. The system of claim 10, wherein the at least one processor is further configured to:
   receive, from the second replica node, an inquiry message requesting records on the first replica node for which the first replica node indicates durable status, wherein the inquiry message is broadcast to a plurality of replica nodes of the cluster; and
   transmit, to the second replica node, a response to the inquiry message indicative of which records have durable status on the first replica node, wherein the update message is based, at least in part, on the responses received from the replica nodes of the cluster by the second replica node.

17. The system of claim 10, wherein the at least one processor is further configured to:
   in response to the determination, commit the record on the first replica node.

18. The system of claim 10, wherein the at least one processor is further configured to:
   process a further read request to read a second record; and
   in response to the value of the second record being unavailable on the first replica node, forward the further read request to a third replica node of the cluster.

19. A non-transitory computer-readable storage device having instructions stored thereon that, when executed by at least one computing device, cause the at least one computing device to perform operations comprising:
   receiving, from a first user node, a read request to read a record on a first replica node of a cluster of replica nodes;
   retrieving a commitment status associated with the record on the first replica node of the cluster, wherein the commitment status indicates that the record on the first replica node of the cluster is ambiguous or in doubt;
   determining, based on the commitment status, that the record is not committed on the first replica node of the cluster;
   in response to the determining, receiving, from a second replica node of the cluster, an indication that the record is stored on a number of replica nodes of the cluster that include durable status for the record, wherein the number exceeds a threshold;
   in response to the indication, transmitting, to the first user node, a value of the record on the first replica node;
   further in response to the indication, updating the commit status associated with the record on the first replica node of the cluster; and
   in response to the updating, sending the updated commit status to another replica node of the cluster.

20. The non-transitory computer-readable storage device of claim 19, the operations further comprising:
   receiving, from a second user node, a write request to write the value of the record on the first replica node, wherein the write request is transmitted to each replica node of the cluster;
   writing the value of the record in a persistent storage on the first replica node; and
   transmitting, to the second user node, an acknowledgement of making the record durable on the first replica node.

* * * * *